(12) United States Patent
Ye et al.

(10) Patent No.: US 10,883,842 B2
(45) Date of Patent: Jan. 5, 2021

(54) SYSTEMS AND METHODS FOR ROUTE SEARCHING

(71) Applicant: BEIJING DIDI INFINITY TECHNOLOGY AND DEVELOPMENT CO., LTD., Beijing (CN)

(72) Inventors: Zhou Ye, Beijing (CN); Yu Wang, Beijing (CN); Dan Shao, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/572,662

(22) Filed: Sep. 17, 2019

(65) Prior Publication Data

US 2020/0011676 A1 Jan. 9, 2020

Related U.S. Application Data

(63) Continuation of application No. PCT/CN2017/116099, filed on Dec. 14, 2017.

(30) Foreign Application Priority Data

Mar. 23, 2017 (CN) .......................... 2017 1 0179750

(51) Int. Cl.
*G01C 21/34* (2006.01)
*G06N 3/08* (2006.01)

(52) U.S. Cl.
CPC ....... *G01C 21/343* (2013.01); *G01C 21/3446* (2013.01); *G06N 3/084* (2013.01)

(58) Field of Classification Search
CPC combination set(s) only.
See application file for complete search history.

(56) References Cited

U.S. PATENT DOCUMENTS

| 8,825,383 B1 | 9/2014 | Kirmse et al. |
| 9,097,549 B1 | 8/2015 | Rao et al. |

(Continued)

FOREIGN PATENT DOCUMENTS

| CN | 104268664 A | 1/2015 |
| CN | 104572826 A | 4/2015 |

(Continued)

OTHER PUBLICATIONS

International Search Report in PCT/CN2017/116099 dated Mar. 15, 2018, 5 pages.

(Continued)

*Primary Examiner* — Robert T Nguyen
(74) *Attorney, Agent, or Firm* — Metis IP LLC

(57) ABSTRACT

The present disclosure relates to systems and methods for searching for a route. The systems may perform the methods to obtain route information of a first route; encode the route information of the first route into a first code based on a target model; access a target database in at least one storage medium, wherein the target database includes a plurality of candidate codes encoded through the target model from a plurality of candidate routes; identify, from the plurality of candidate codes, a second code based on the first code, the second code being associated with at least one second route; and send information associated with the at least one second route to a receiving device.

20 Claims, 11 Drawing Sheets

(56) References Cited

U.S. PATENT DOCUMENTS

| | | | |
|---|---|---|---|
| 10,274,330 B2* | 4/2019 | Unger | G01C 21/3461 |
| 2008/0091347 A1 | 4/2008 | Tashiro | |
| 2016/0195403 A1* | 7/2016 | Tuukkanen | G01C 21/20 |
| | | | 701/533 |
| 2017/0076199 A1 | 3/2017 | Zhang et al. | |
| 2017/0276499 A1 | 9/2017 | Sun et al. | |
| 2018/0173240 A1* | 6/2018 | Fang | B60W 50/0097 |
| 2018/0253647 A1* | 9/2018 | Yu | G06K 9/627 |
| 2019/0033085 A1* | 1/2019 | Ogale | G06N 3/084 |
| 2020/0103238 A1* | 4/2020 | Judka | G01C 21/3492 |
| 2020/0217680 A1* | 7/2020 | Dewan | G01C 21/343 |

FOREIGN PATENT DOCUMENTS

| | | |
|---|---|---|
| CN | 105137967 A | 12/2015 |
| CN | 105302858 A | 2/2016 |
| CN | 105677686 A | 6/2016 |
| CN | 106295906 A | 1/2017 |
| WO | 2016078608 A1 | 5/2016 |
| WO | 2016168690 A1 | 10/2016 |

OTHER PUBLICATIONS

Written Opinion in PCT/CN2017/116099 dated Mar. 15, 2018, 4 pages.

The Extended European Search Report in European Application No. 17902011.0 dated Jan. 14, 2020, 9 pages.

Zhang Chong, Text Classification Based on Attention-Based LSTM Model, China Excellent Master's Thesis Full-text Database Information Technology Series, 2016, 65 pages.

Qian Long, Deep Sparse Coding Model and its Application, China Excellent Master's Thesis Full-text Database, 2015, 66 pages.

Hu Kongfa et al, Path Coding and Frequent Path Mining in Modern Logistics Management System, Computer Integrated Manufacturing Systems, 14(12): 2441-2446, 2008.

Zhang Xuegong, Multilayer Perceptron Neural Network, Pattern Recognition (third edition), 2010, 35 pages.

* cited by examiner

SYSTEMS AND METHODS FOR ROUTE SEARCHING

CROSS-REFERENCE TO RELATED APPLICATIONS

This application is a continuation application of International Application No. PCT/CN2017/116099, filed on Dec. 14, 2017, which claims priority to Chinese Application No. 201710179750.3 filed on Mar. 23, 2017, the contents of which are incorporated herein by reference.

TECHNICAL FIELD

The present disclosure generally relates to systems and methods for on-demand service, and in particular, to systems and methods for searching for at least one route similar to a target route based on a Recurrent Neural Network (RNN) model.

BACKGROUND

On-demand services (e.g., a taxi hailing service) utilizing Internet technology have become increasingly popular because of their convenience. For a service request that the requestor agrees to share a transportation service with other requestors, a system providing the transportation service should identify candidate service requests which have similar routes with the service request. Therefore, it is desirable to provide systems and methods for searching for similar routes quickly and efficiently.

SUMMARY

According to an aspect of the present disclosure, a system is provided. The system may include at least one storage medium and at least one processor in communication with the at least one storage medium. The at least one storage medium may include a set of instructions for searching for a route. When the at least one processor executes the set of instructions, the at least one processor may be directed to perform one or more of the following operations. The at least one processor may obtain route information of a first route. The at least one processor may encode the route information of the first route into a first code based on a target model, wherein the target model may be configured to encode a route into a code having a predetermined length of n bytes, n being an integer larger than 1, and encode substantially similar routes into a same code. The at least one processor may access a target database in the at least one storage medium, wherein the target database may include a plurality of candidate codes encoded through the target model from a plurality of candidate routes. The at least one processor may identify, from the plurality of candidate codes, a second code based on the first code, wherein the second code may be associated with at least one second route. The at least one processor may send information associated with the at least one second route to a receiving device.

According to another aspect of the present disclosure, a method is provided. The method may be implemented on a computing device having at least one processor, at least one storage medium, and a communication platform connected to a network. The method may include one or more of the following operations. The at least one processor may obtain route information of a first route. The at least one processor may encode the route information of the first route into a first code based on a target model, wherein the target model may be configured to encode a route into a code having a predetermined length of n bytes, n being an integer larger than 1, and encode substantially similar routes into a same code. The at least one processor may access a target database in the at least one storage medium, wherein the target database may include a plurality of candidate codes encoded through the target model from a plurality of candidate routes. The at least one processor may identify, from the plurality of candidate codes, a second code based on the first code, wherein the second code may be associated with at least one second route. The at least one processor may send information associated with the at least one second route to a receiving device.

According to yet another aspect of the present disclosure, a non-transitory computer readable medium is provided. The non-transitory computer readable medium may include a set of instructions for searching for a route. When the set of instructions is executed by at least one processor, the set of instructions may effectuate the at least one processor to perform one or more of the following operations. The at least one processor may obtain route information of a first route. The at least one processor may encode the route information of the first route into a first code based on a target model, wherein the target model may be configured to encode a route into a code having a predetermined length of n bytes, n being an integer larger than 1, and encode substantially similar routes into a same code. The at least one processor may access a target database in the at least one storage medium, wherein the target database may include a plurality of candidate codes encoded through the target model from a plurality of candidate routes. The at least one processor may identify, from the plurality of candidate codes, a second code based on the first code, wherein the second code may be associated with at least one second route. The at least one processor may send information associated with the at least one second route to a receiving device.

In some embodiments, the route information of the first route may include location information of m waypoints along the first route, wherein a sequence of the m waypoints may correspond to a direction of the first route, wherein m is an integer larger than 1 and independent from n.

In some embodiments, the target model may include a recurrent neural network (RNN) model having a hidden layer, the hidden layer including at least m neurons. The RNN model may be obtained by a training process. The training process may include setting initial parameters of the RNN model, wherein the initial parameters include a first parameter associated with an input layer of the RNN model and a second parameter associated with the hidden layer of the RNN model; obtaining sample route information of a plurality of sample routes, wherein each of the plurality of sample routes may include a plurality of sample waypoints, and the sample route information may include sample location information of the plurality of sample waypoints; for each of the plurality of sample routes, determining output information associated with the at least m neurons in the hidden layer based on the initial parameters, a predetermined nonlinear activation function, and the sample route information, wherein for a first neuron in the at least m neurons, an input is sample location information of a first sample waypoint in the plurality of sample waypoints and for an $i^{th}$ neuron in the at least m neurons, the input includes sample location information of an $i^{th}$ waypoint in the plurality of waypoints and an output of an $(i-1)^{th}$ neuron in the at least m neurons; and determining trained parameters of the RNN model based on the output information.

In some embodiments, the determining output information associated with the at least m neurons in the hidden layer may include: determining a first 1*n vector corresponding to the output of the $(i-1)^{th}$ neuron; determining a 1*2 vector corresponding to the sample location information of the $i^{th}$ sample waypoint; determining a 1*(n+2) matrix based on the 1*n vector corresponding to the $(i-1)^{th}$ neuron and the 1*2 vector corresponding to the sample location information of the $i^{th}$ sample waypoint; determining a (n+2)*n matrix based on the first parameter and the second parameters, wherein the first parameter is an n*n matrix and the second parameter is a 2*n matrix; determining a 1*n matrix corresponding to the $i^{th}$ neuron based on the 1*(n+2) matrix and the (n+2)*n matrix; and determining a second 1*n vector corresponding to an output of the $i^{th}$ neuron based on the 1*n matrix and the predetermined nonlinear activation function.

In some embodiments, the determining output information associated with the at least m neurons in the hidden layer may include: determining a first n*1 vector corresponding to the output of the $(i-1)^{th}$ neuron; determining a 2*1 vector corresponding to the sample location information of the $i^{th}$ sample waypoint; determining a (n+2)*1 matrix based on the n*1 vector corresponding to the $(i-1)^{th}$ neuron and the 2*1 vector corresponding to the sample location information of the $i^{th}$ sample waypoint; determining an n*(n+2) matrix based on the first parameter and the second parameters, wherein the first parameter is an n*n matrix and the second parameter is an n*2 matrix; determining a n*1 matrix corresponding to the $i^{th}$ neuron based on the 1*(n+2) matrix and the (n+2)*n matrix; and determining a second n*1 vector corresponding to an output of the $i^{th}$ neuron based on the n*1 matrix and the predetermined nonlinear activation function.

In some embodiments, the determining trained parameters of the RNN model based on the output information may include determining the trained parameters based on a backpropagation algorithm or a gradient descent algorithm.

In some embodiments, the predetermined nonlinear activation function may include at least one of a sigmoid function, a hyperbolic tangent (tanh) function, and/or a Rectified Linear Units (ReLu) function.

In some embodiments, the at least one processor may determine an n-dimensional vector based on the target model. The at least one processor may generate the first code by encoding the n-dimensional vector based on an encoding function.

In some embodiments, the encoding function may be a function below:

$$h(x) = \begin{cases} 1, & x > 0.5 \\ 0, & x \ll 0.5 \end{cases}$$

where x refers to a value of an element in the n-dimensional vector, and h(x) refers to a code value corresponding to the element in the first code.

In some embodiments, the target model may include a long short-term memory network (LSTM) model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
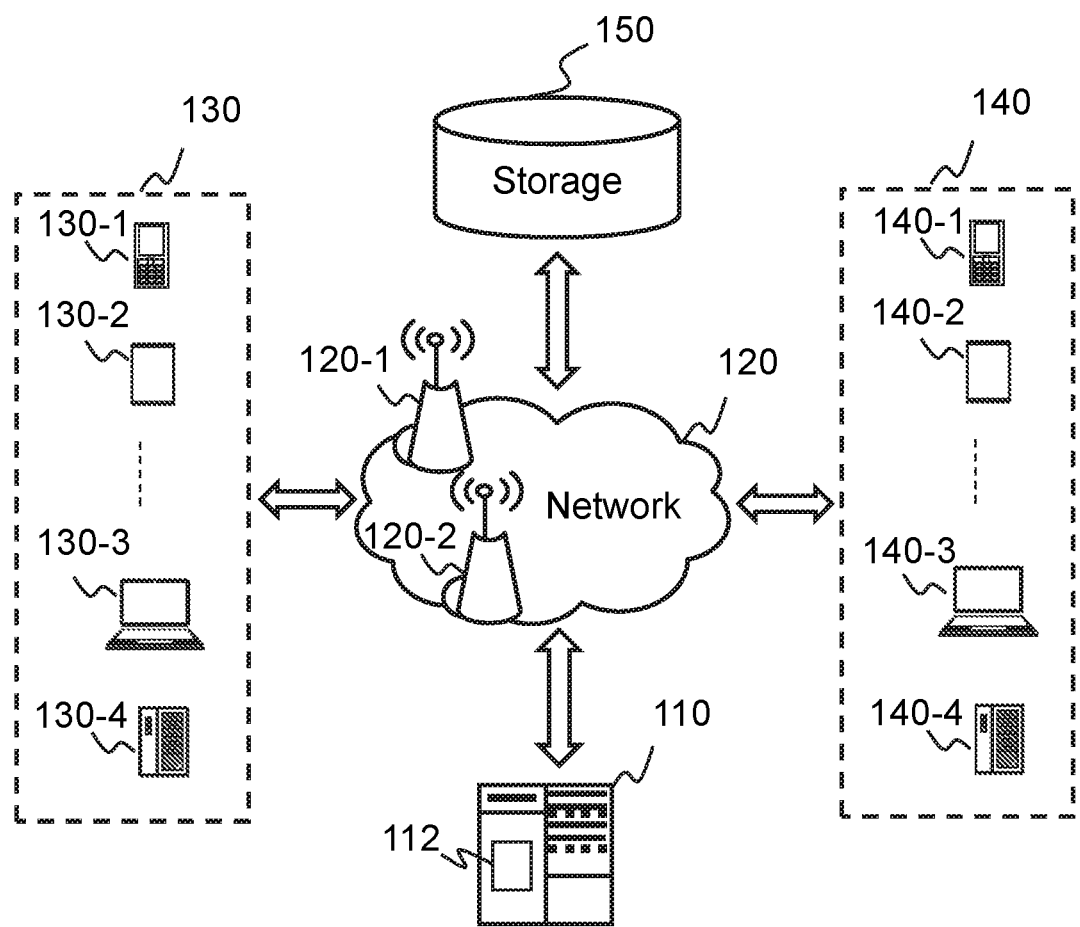
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding an on-demand transportation service, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for searching for similar routes in a database based on codes encoded through a target model (e.g., a trained RNN model and a Hash function) from a plurality of routes. According to the present disclosure, when the systems receive a service request for a transportation service and the requestor agrees to share the transportation service with other requestors, the systems may determine a target route for the service request and search for at least one route similar to the target route in a target database. The target database may include a plurality of candidate codes encoded through a target model from a plurality of candidate routes, wherein the target model may be configured to encode substantially similar routes into a same code. Therefore, the process for searching for route(s) similar to the target route is a process for identifying a code same with a target code corresponding to the target route. Accordingly, it improves the speed and the efficiency of the searching process.

It should be noted that searching for at least one route similar to a target route, overall, is a technology deeply rooted in Internet world. Determining a target route for a service request and searching for at least one route similar to the target route from a plurality of candidate routes associated with a plurality of candidate service requests may be impossible without the possibility of real-time GPS positioning and real-time communication between a terminal and a server. Therefore, the technical solution disclosed in the present disclosure is also a technology deeply rooted in Internet era.

FIG. 1 is a schematic diagram illustrating an exemplary on-demand service system 100 according to some embodiments of the present disclosure. For example, the on-demand service system 100 may be an online transportation service platform for transportation services such as taxi hailing, chauffeur services, delivery vehicles, carpool, bus service, driver hiring and shuttle services. The on-demand service system 100 may be an online platform including a server 110, a network 120, a requestor terminal 130, a provider terminal 140, and a storage 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may be directly connected to the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to a service request to perform one or more functions described in the present disclosure. For example, the processing engine 112 may obtain route information of a target route and determine a route similar to the target route based on the route information. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the on-demand service system 100 (e.g., the server 110, the requestor terminal 130, the provider terminal 140, the storage 150, and the positioning system 160) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may send positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the storage 150 via the network 120. In some embodiments, the storage 150 may be directly connected to or communicate with one or more components in the on-demand service system 100 (e.g., the server 110, the requestor terminal 130, the provider terminal 140, etc.). In some embodiments, the storage 150 may be part of the server 110.

In some embodiments, one or more components in the on-demand service system 100 (e.g., the server 110, the requestor terminal 130, the provider terminal 140, etc.) may have permission to access the storage 150. In some embodiments, one or more components in the on-demand service system 100 may read and/or modify information relating to the requestor, provider, and/or the public when one or more conditions are met. For example, the server 110 may read and/or modify one or more users' information after a service is completed. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the on-demand service system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
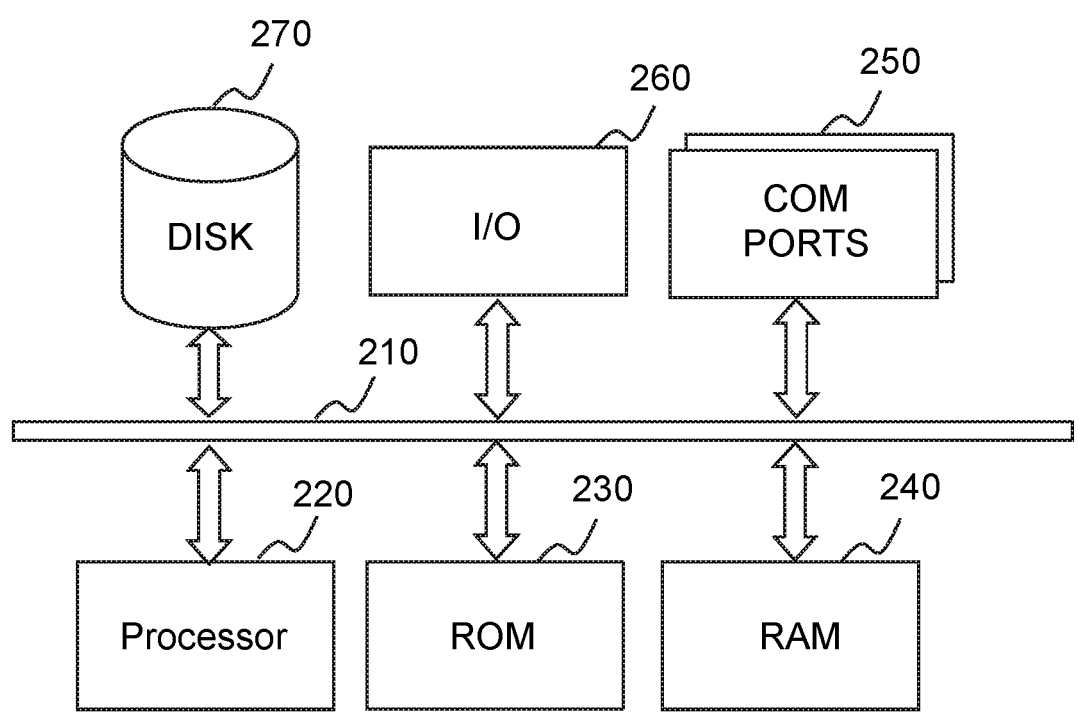
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and/or from a network connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the processor 220. The method and/or process of the present disclosure may be implemented as the program instructions. The computer device 200 also includes an I/O component 260, supporting input/output between the computer and other components. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
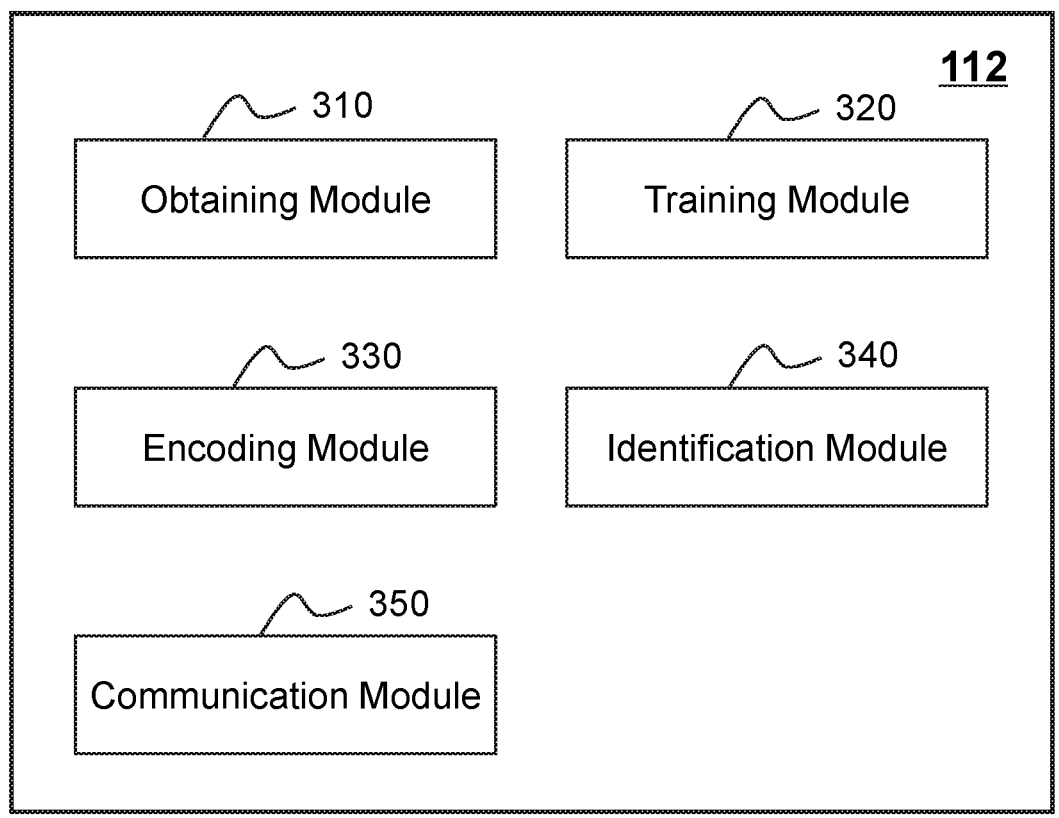
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an obtaining module 310, a training module 320, an encoding module 330, an identification module 340, and a communication module 350.

The obtaining module 310 may be configured to obtain route information of a first route (i.e., a target route). The route information of the first route may include latitude coordinate information and/or longitude coordinate information of a plurality of waypoints (e.g., GPS points) included in the first route. As used herein, the first route may correspond to a service request (also referred to as a "target service request") for a transportation service (e.g., a taxi service) and a requestor who initiates the service request agrees to share the transportation service with other requestors. The service request may include a target start location, a target destination, a target start time, etc.

The training module 320 may be configured to train a target model or part of it (e.g., a Recurrent Neural Network (RNN) model). In some embodiments, the target model may be a combination of a RNN model and an encoding function (e.g., a Hash function). The target model may be configured to encode a route into a code having a predetermined length of n bytes (wherein n is an integer larger than 1) and encode substantially similar routes into a same code. As used herein, taking a route A and a route B as an example, "substantially similar routes" may refer to that a similarity between route information of the route A and that of the route B is larger than a threshold (e.g., 60%, 70%, 75%, 80%, 85%, 90%, or 95%). The training module 320 may train the RNN model based on sample route information of a plurality of sample routes (e.g., a plurality of historical routes associated with a plurality of historical service orders).

The encoding module 330 may be configured to encode the route information of the first route into a first code (i.e., a target code) based on the target model. For example, the encoding module 330 may determine an n-dimensional vector corresponding to the route information of the first route based on the RNN model. The encoding module 330 may further encode the n-dimensional vector into the first code based on an encoding function (e.g., a Hash function).

The identification module 340 may be configured to identify a second code associated with at least one second route based on the first route. The identification module 340 may access a target database (e.g., the storage 150) including a plurality of candidate codes encoded through the target model from a plurality of candidate routes. The plurality of candidate routes may be associated with a plurality of candidate service requests from a plurality of candidate requestors. As used herein, for each of the plurality of candidate service requests, the candidate requestor agrees to share the transportation service with other requestors, a candidate start location or a candidate destination is within a same region (e.g., a same city, a same district) with the target start location or the target destination, and a time difference between a candidate start time and the target start time is less than a time threshold (e.g., 1 hour, 2 hours).

The identification module 340 may further identify the second code associated with the at least one second route from the plurality of candidate codes based on the first code. The second code may be the same as the first code and the at least one second route may be similar to the first route.

The communication module 350 may be configure to transmit information associated with the at least one second route to a receiving device (e.g., the requestor terminal 130, the provider terminal 140). In some embodiments, the information associated with the at least one second route may be presented on the requestor terminal 130 and/or the provider terminal 140 in a format of text, image, video content, audio content, graphics, etc. In some embodiments, the information associated with the at least one second route may be transmitted and/or received via a message using any suitable communication protocol (e.g., the Hypertext Transfer Protocol (HTTP), Address Resolution Protocol (ARP), Dynamic Host Configuration Protocol (DHCP), File Transfer Protocol (FTP), etc.).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the obtaining module 310 and the communication module 350 may be combined as a single module which may both obtain the route information of the first route and send the information associated with the at least one second route to a receiving device. As another example, the processing engine 112 may include a storage module (not shown in FIG. 3) which may be configured to store any information and/or data (e.g., the route information of the first route, the information associated with the at least one second route, etc.) associated with the first route and/or the at least one second route.

Figure 4A:
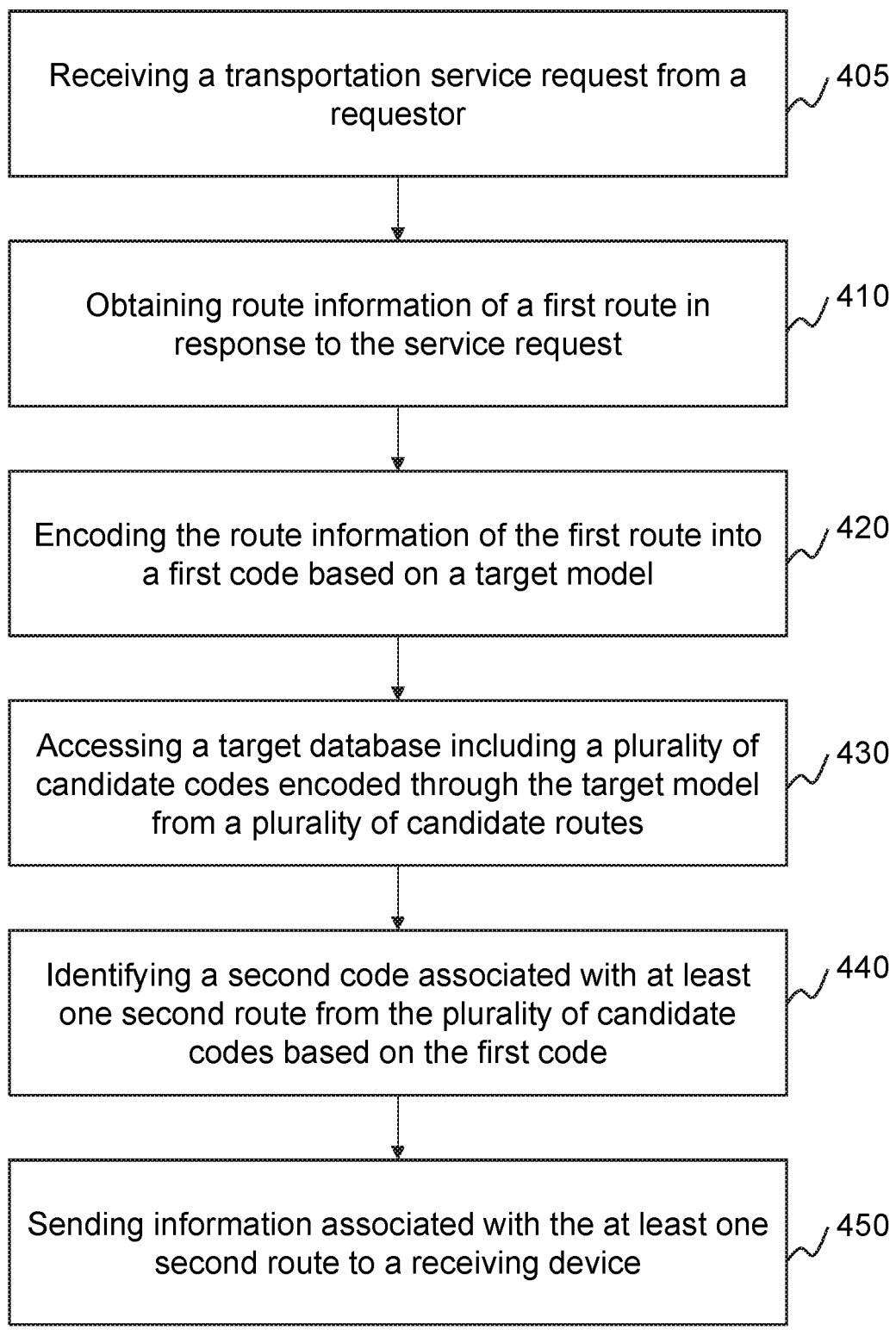
FIG. 4A is a flowchart illustrating an exemplary process for determining at least one route similar to a target route according to some embodiments of the present disclosure.

FIG. 4A is a flowchart illustrating an exemplary process 400 for determining at least one route similar to a target route according to some embodiments of the present disclosure. The process 400 may be implemented as a set of instructions (e.g., an application) stored in the storage ROM 230 or RAM 240. The processor 220 and/or the modules illustrated in FIG. 3 may execute the set of instructions, and when executing the instructions, it may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In step 405, the processing engine 112 (e.g., the obtaining module 310) (e.g., the interface circuits of the processor 220) may receive a transportation service request from a requestor.

Figure 4B:
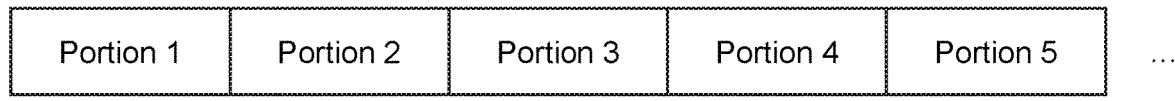
FIG. 4B is a schematic diagram illustrating an exemplary electronic signal associated with a service request according to some embodiments of the present disclosure.

The transportation service may be electronic signals sent from a requestor terminal 130, such as a mobile phone, of the requestor. Further, the electronic signal may include at least 5 portions, as shown in FIG. 4B. The first portion of the electronic signals may encode a data head identifying starting of the request itself. The second portion may encode data identifying an identity of the terminal device and/or an ID of the requestor. The third portion of the electronic signal may encode information relating to a target start location and a target destination of the requested transportation service. The third portion may also include a target start time of the transportation service. The fourth portion of the electronic signals may include data showing additional restrictions of the transportation service. For example, the restriction may be that the requestor agrees to share the transportation service with other requestors. The fifth portion of the electronic signals may be an end mark, identifying the end of the electronic signals.

The above portions in the electronic signals may be placed in a predetermined order. The predetermined order may be a sequential order from portion 1 to portion 5 (e.g., portion 1, portion 2, portion 3, portion 4, portion 5). Alternatively, the predetermined order may be a predetermined but disrupted order except the data that mark the beginning and ending of the electronic signals (e.g., portion 1, portion 3, portion 4, portion 2, portion 5). Alternatively, the portions of the electronic signals (except the data that mark the beginning and ending of the electronic signals) may be randomly arranged, so that the transportation service request from one requestor may have a different structure from that from another requestor, leaving the system that receives the electronic signals to recognize what is in the electronic signals.

In step 410, the processing engine 112 (e.g., the obtaining module 310) (e.g., the interface circuits of the processor 220) may obtain route information of a first route (also referred to as a "target route") in response to the service request. The route information of the first route may include latitude coordinate information and/or longitude coordinate information of a plurality of waypoints (e.g., GPS points) included in the first route.

As used herein, the first route may correspond to the service request (also referred to as a "target service request") for a transportation service (e.g., a taxi service) and the service request may agree to share the transportation service with other requestors. As introduced above, the service request may include the target start location, the target destination, the target start time, etc. In some embodiments, the requestor may input the target start location and the target destination via the requestor terminal 130 and initiate the service request to the on-demand service system 100. The processing engine 112 may receive the service request and determine a recommended route (i.e., the first route) based on the target start location and the target destination. In some embodiments, after receiving the input by the requestor, the requestor terminal 130 may determine the recommended route based on the target start location and the target destination and transmit the recommended route to the processing engine 112.

In step 420, the processing engine 112 (e.g., the encoding module 330 (e.g., the processing circuits of the processor 220) may encode the route information of the first route into a first code based on a target model.

The processing engine 112 may obtain the target model from the training module 320 or a storage device (e.g., the storage 150) disclosed elsewhere in the present disclosure. The target model may be configured to encode a route into a code having a predetermined length of n bytes (wherein n is an integer larger than 1) and encode substantially similar routes into a same code. As used herein, taking a route A and a route B as an example, "substantially similar routes" may refer to that a similarity between route information of the route A and that of the route B is larger than a threshold (e.g., 60%, 70%, 75%, 80%, 85%, 90%, or 95%).

In some embodiments, the target model may be a combination of a RNN model and an encoding function (e.g., a Hash function). The processing engine 112 may determine an n-dimensional vector corresponding to the route information of the first route based on the RNN model and further encode the n-dimensional vector into the first code based on an encoding function (e.g., a Hash function). As used herein, n refers to a predetermined coding length and parameters of the RNN model may be associated with n (e.g., see, FIG. 6 and the description thereof).

In some embodiments, the RNN model may include a plurality of neurons and a number of the plurality of neurons may be larger than or equal to a number of the plurality of waypoints in the first route.

In step 430, the processing engine 112 (e.g., the identification module 340) (e.g., the interface circuits of the processor 220) may access a target database (e.g., the storage 150) including a plurality of candidate codes encoded through the target model from a plurality of candidate routes. The plurality of candidate routes may be associated with a plurality of candidate service requests from a plurality of candidate requestors. As used herein, for each of the plurality of candidate service requests, the candidate requestor agrees to share the transportation service with other requestors, a candidate start location or a candidate destination is within a same region (e.g., a same city, a same district) with the target start location or the target destination, and a time difference between a candidate start time and the target start time is less than a time threshold (e.g., 1 hour, 2 hours).

Figure 4C:
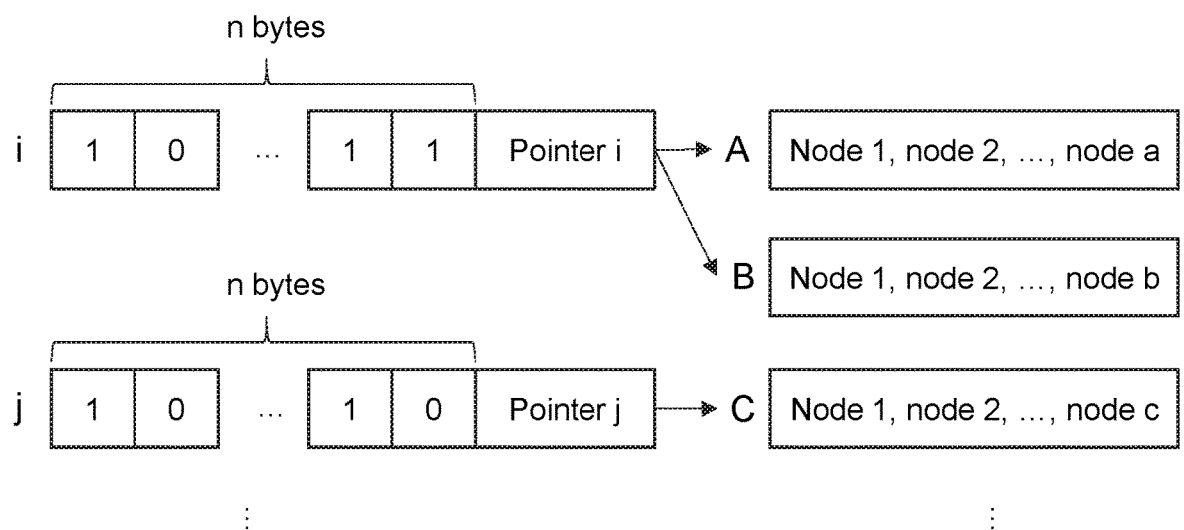
FIG. 4C is a schematic diagram illustrating an exemplary data structure of a target database storing a plurality of codes and/or routes according to some embodiments of the present disclosure.
Figure 4D:
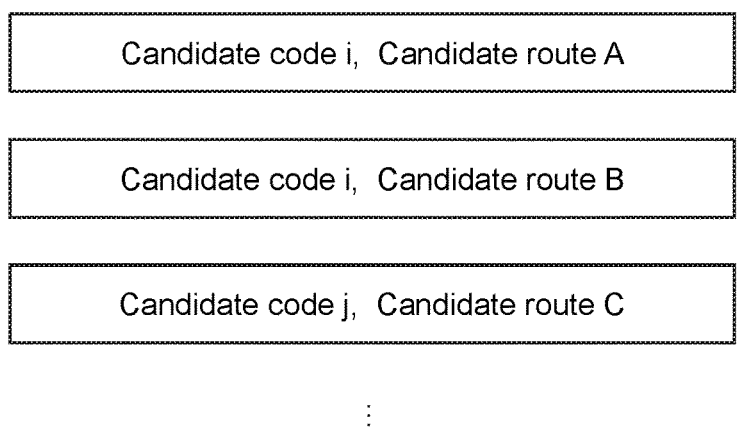
FIG. 4D is a schematic diagram illustrating an exemplary data structure of a target database storing a plurality of codes and/or routes according to some embodiments of the present disclosure.

In some embodiments, the plurality of candidate codes and/or the plurality of candidate routes may be stored in the target database in various data structures. For example, as illustrated in FIG. 4C, the plurality of candidate codes may be stored in a first data sheet and the plurality of candidate routes may be stored in a second data sheet. The plurality of candidate codes may point to the plurality of candidate routes via one or more pointers. As described above, the target model may be configured to encode substantially similar routes into a same code. Therefore, it can be seen that a candidate route A and a candidate route B are substantially similar and encoded into a candidate route i. The candidate route i points to the candidate route A and B via a pointer i. Similarly, a candidate code j points to a candidate route C via a pointer j. As another example, as illustrated in FIG. 4D, the plurality of codes and the plurality of routes may be integrated in a data sheet and each row of the data sheet includes data records associated with a candidate code and a corresponding candidate route. For example, the first row includes data records of the candidate code i and the candidate route A, the second row includes data records of the candidate code i and the candidate route B, the third row includes data records of the candidate code j and the candidate route C, etc. With the above-mentioned data structure, a server may quickly search the candidate routes through the candidate codes.

In step 440, the processing engine 112 (e.g., the identification module 340) (e.g., the processing circuits of the processor 220) may identify a second code associated with at least one second route from the plurality of candidate codes based on the first code. The second code may be the same as the first code. As described in connection with step 420, the target model may be configured to encode substantially similar routes into a same code. Therefore, the at least one second route may be similar to the first route.

In step 450, the processing engine 112 (e.g., the communication module 350) (e.g., the interface circuits of the processor 220) may send information associated with the at least one second route to a receiving device.

For example, after identifying the at least one second route, the processing engine 112 may identify at least one second service request corresponding to the at least one second route and combine the at least one second service request and the target service request as a request group. Further, the processing engine 112 may send the request group to a plurality of provider terminals 140. In response to an acceptance of the request group by a service provider, the processing engine 112 may send information (e.g., a start location, a destination, and/or a start time associated with the at least one second route) associated with the request group to the provider terminal 140 and the requestor terminals 130.

In some embodiments, the information associated with the at least one second route may be presented on the requestor terminal 130 and/or the provider terminal 140 in a format of text, image, video content, audio content, graphics, etc. In some embodiments, the information associated with the at least one second route may be transmitted and/or received via a message using any suitable communication protocol (e.g., the Hypertext Transfer Protocol (HTTP), Address Resolution Protocol (ARP), Dynamic Host Configuration Protocol (DHCP), File Transfer Protocol (FTP), etc.).

For illustration purposes, the present disclosure describes an application scenario in which the processing engine 112 receives a service request for a transportation service and the requestor agrees to share the transportation service with other requestors. Further, the processing engine 112 determines a target route for the service request and determines at least one route similar to the target route. It should be noted that the application scenario is only provided for illustration, the present disclosure may be applied in any other application scenario.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 430 and step 440 may be combined as a single step in which the processing engine 112 may both access the target database and identify the second code associated with the at least one second route in the target database. As another example, one or more other optional steps (e.g., a storing step) may be added elsewhere in the exemplary process 400. In the storing step, the processing engine 112 may store information and/or data (e.g., the first code, the information associated with the at least one second route, etc.) associated with the first route and/or the at least one second route in a storage device (e.g., the storage 150) disclosed elsewhere in the present disclosure.

Figure 5:
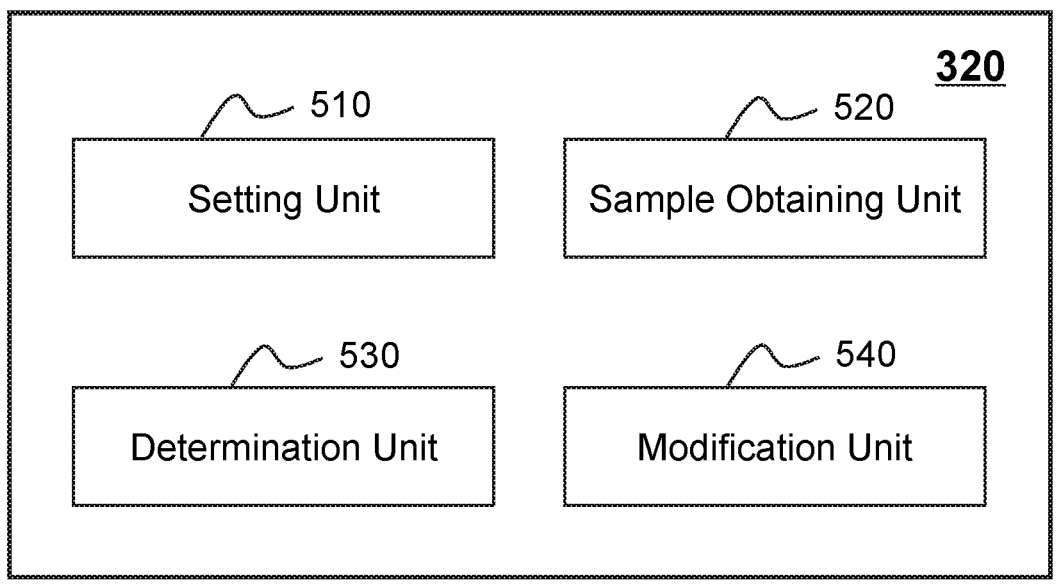
FIG. 5 is a block diagram illustrating an exemplary training module according to some embodiments of the present disclosure.

FIG. 5 is a block diagram illustrating an exemplary training module 320 according to some embodiments of the present disclosure. The training module 320 may include a setting unit 510, a sample obtaining unit 520, a determination unit 530, and a modification unit 540.

The setting unit 510 may be configured to set initial parameters of a RNN model. The RNN model may include an input layer, a hidden layer, and an output layer (e.g., see, FIG. 7 and the description thereof). The initial parameters may include a first initial parameter associated with the input layer and a second initial parameter associated with the hidden layer. The initial parameters may be default settings of the system 100, or may be adjustable under different situations.

The sample obtaining unit 520 may be configured to obtain sample route information of a plurality of sample routes. The processing engine 112 may obtain the sample route information from a storage device (e.g., the storage 150) disclosed elsewhere in the present disclosure. The plurality of sample routes may be associated with a plurality of historical service orders within a predetermined time period (e.g., last month, last year, etc.). Each of the plurality of sample routes may include a plurality of sample waypoints. For a specific sample route, the sample route information may include sample location information (e.g., longitude coordinate information, latitude coordinate information) of the plurality of sample waypoints included in the sample route.

The determination unit 530 may be configured to determine output information associated with a plurality of neurons in the hidden layer of the RNN model based on the initial parameters and the plurality of sample routes. For a specific sample route, the output information may be an n-dimensional vector (e.g., see, FIG. 6 and the description thereof).

The modification unit 540 may be configured to determine trained parameters of the RNN model based on the output information. For example, the processing engine 112 may modify the first initial parameter and the second initial parameter by using a backpropagation algorithm or a gradient descent algorithm. The gradient descent algorithm may include Stochastic Gradient Descent, Batch Gradient Descent, Mini-batch Gradient Descent, etc.

The units in the training module 320 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single module, and any one of the units may be divided into two or more sub-units. For example, the training module 320 may include a storage unit (not shown) used to store any information (e.g., the initial parameters) associated with the RNN model. As another example, the units in the training module 320 may include a storage sun-unit (not shown) respectively.

Figure 6:
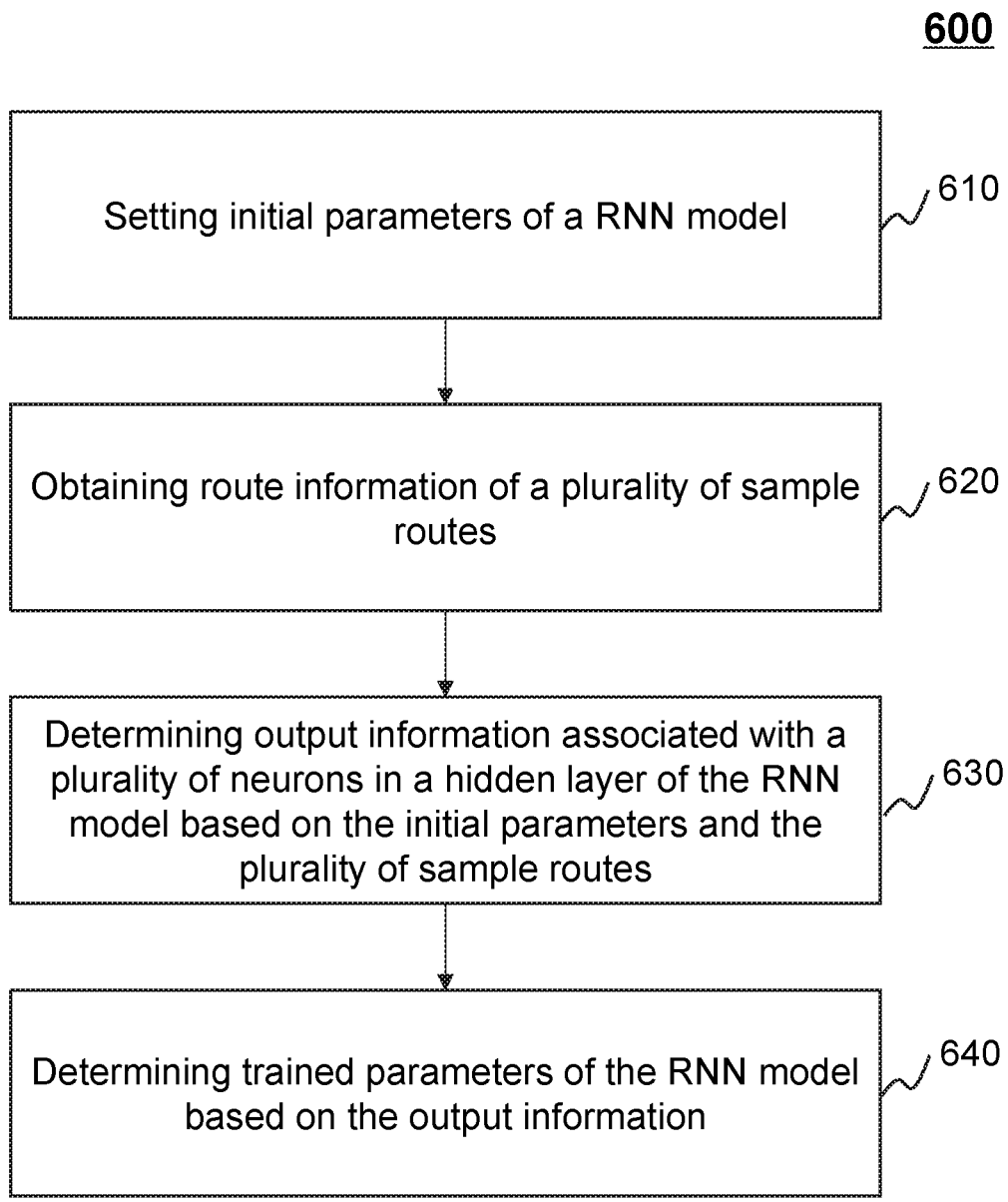
FIG. 6 is a flowchart illustrating an exemplary process for training a Recurrent Neural Network (RNN) model according to some embodiments of the present disclosure.

FIG. 6 is a flowchart illustrating an exemplary process 600 for training a RNN model according to some embodiments of the present disclosure. The process 600 may be implemented as a set of instructions (e.g., an application) stored in the storage ROM 230 or RAM 240. The processor 220 and/or the units in FIG. 5 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In step 610, the processing engine 112 (e.g., the setting unit 510) (e.g., the processing circuits of the processor 220) may set initial parameters of a RNN model (e.g., a long short-term memory network (LSTM) model). The RNN model may include an input layer, a hidden layer, and an output layer (e.g., see, FIG. 7 and the description thereof). The initial parameters may include a first initial parameter associated with the input layer and a second initial parameter associated with the hidden layer. The initial parameters may be default settings of the system 100, or may be adjustable under different situations.

In step 620, the processing engine 112 (e.g., the sample obtaining unit 520) (e.g., the interface circuits of the processor 220) may obtain sample route information of a plurality of sample routes. The plurality of sample routs may be associated with a plurality of historical service orders within a predetermined time period (e.g., last month, last year, etc.) The processing engine 112 may obtain the sample route information from a storage device (e.g., the storage 150) disclosed elsewhere in the present disclosure.

Each of the plurality of sample routes may include a plurality (e.g., 4, 24, 50, 200, 1000, etc.) of sample waypoints. For example, for a specific sample route, the sample route information may include sample location information of the sample waypoints illustrated below:

$$R^{(l)}=[Z_1^{(l)}, Z_2^{(l)}, \ldots, Z_i^{(l)} \ldots, Z_m^{(l)}], (1 \le l \le L, 1 \le i \le m) \quad (1)$$

where l refers to a specific sample route, L refers to a number of the plurality of sample routes, $R^{(l)}$ refers to the route information of the sample route l, m refers to a number of the plurality of sample waypoints in the sample route l, $Z_i^{(l)}$ refers to sample location information of a specific waypoint i in the sample route l, and a sequence of the plurality of sample waypoints corresponds to a direction of the sample route l.

In some embodiments, the sample location information of the plurality of sample waypoints may be expressed as longitude-latitude coordinates, therefore, the route information of the sample route may be expressed as below:

$$R^{(l)}=[(x_1^{(l)}, y_1^{(l)}), (x_2^{(l)}, y_2^{(l)}), \ldots, (x_m^{(l)}, y_m^{(l)})], (1 \le l \le L, 1 \le i \le m) \quad (2)$$

where $x_i^{(l)}$ refers to a longitude coordinate of a sample waypoint i in the sample route l, and $y_i^{(l)}$ refers to a latitude coordinate of the sample waypoint i in the sample route l.

In step 630, the processing engine 112 (e.g., the determination unit 530) (e.g., the processing circuits of the processor 220) may determine output information associated with a plurality of neurons in the hidden layer of the RNN model based on the initial parameters and the plurality of sample routes.

Take a specific sample route as an example, the specific sample route includes a plurality of sample waypoints, and each of the plurality of sample waypoints corresponds to a neuron of the plurality of neurons in the hidden layer. For example, sample location information of an $i^{th}$ waypoint and an $(i+1)^{th}$ waypoint may be inputted to an $i^{th}$ neuron and an $(i+1)^{th}$ neuron respectively. Additionally, output information of the $i^{th}$ neuron may also be inputted into the $(i+1)^{th}$ neuron.

The processing engine 112 may determine the output information associated with the plurality of neurons according to formula (3) below:

$$S_i^{(l)}=g(U*Z_i^{(l)}+V*S_{i-1}^{(l)}), (1 \le l \le L, 1 \le i \le m, S_0^{(l)}=0) \quad (3)$$

where $S_i^{(l)}$ refers to output information of an $i^{th}$ neuron, U refers to the first initial parameter associated with the input layer, $Z_i^{(l)}$ refers to sample location information of an $i^{th}$ sample waypoint in the specific sample route l, V refers to the second initial parameter associated with the hidden layer, $S_{i-1}^{(l)}$ refers to output information of an $(i-1)^{th}$ neuron, and g refers to a predetermined non-linear activation function (e.g., a sigmoid function). In some embodiments, the predetermined non-linear activation function may include a sigmoid function, a hyperbolic tangent (tanh) function, a Rectified Linear Units (ReLu) function, etc.

In some embodiments, according to formula (3), the processing engine 112 may establish matrixes associated with the first initial parameter, the second initial parameter, the sample location information of an $i^{th}$ sample waypoint in the specific sample route, and/or the output information of an $(i-1)^{th}$ neuron, and determine the output information of the $i^{th}$ neuron based on the matrixes.

For example, the processing engine 112 may determine a first 1*n vector corresponding to the output information of the $(i-1)^{th}$ neuron (n is a predetermined coding length which is an integer larger than 1 and independent from the number of the plurality of neurons in the hidden layer) and a 1*2 vector corresponding to the sample location information of the $i^{th}$ sample waypoint. The processing engine 112 may further determine a 1*(n+2) matrix $A_1$ based on the first 1*n vector and the 1*2 vector. Further, the processing engine 112 may determine a 2*n matrix corresponding to the first initial parameter and an n*n matrix corresponding to the second initial parameter. Then the processing engine 112 may further determine a (n+2)*n matrix $B_1$ based on the 2*n matrix and the n*n matrix. Still further, the processing engine 112 may determine a 1*n matrix $D_1$ based on the 1*(n+2) matrix $A_1$ and the (n+2)*n matrix $B_1$. Finally, the processing engine 112 may determine a second 1*n vector corresponding to the output information of the $i^{th}$ neuron based on the predetermined non-linear activation and the 1*n matrix $D_1$.

As another example, the processing engine 112 may determine a first n*1 vector corresponding to the output of the $(i-1)^{th}$ neuron (n is the predetermined coding length) and a 2*1 vector corresponding to the sample location information of the $i^{th}$ sample waypoint. The processing engine 112 may further determine a (n+2)*1 matrix $A_2$ based on the n*1 vector and the 2*1 vector. Further, the processing engine 112 may determine an n*2 matrix corresponding to the first initial parameter and an n*n matrix corresponding to the second initial parameter. Then the processing engine 112 may determine an n*(n+2) matrix $B_2$ based on the n*2 matrix and the n*n matrix. Still further, the processing engine 112 may determine an n*1 matrix $D_2$ based on the 1*(n+2) matrix $A_2$ and the (n+2)*n matrix $B_2$. Finally, the processing engine 112 may determine a second n*1 vector corresponding to the output information of the $i^{th}$ neuron based on the predetermined nonlinear activation function g and the n*1 matrix $D_2$.

Merely for illustration, a particular example is described below. Assuming that the hidden layer includes 4 neurons, the sample route includes 4 sample waypoints, and the predetermined coding length is 3.

Take the fourth neuron as an example, the processing engine 112 may determine a 1*(3+2) matrix $M_1$ based on a 1*3 vector corresponding to output information of the third neuron and a 1*2 vector corresponding to sample location information of the fourth sample waypoint as illustrated below:

$$M_1 = [b\ c\ d\ x\ y],$$

$$S_3 = (b\ c\ d),$$

$$Z_4 = (x\ y) \qquad (4)$$

where $S_3$ refers to the output information of the third neuron and $Z_4$ refers to the sample location information of the fourth sample waypoint.

The processing engine 112 may further determine a (3+2)*3 matrix $N_1$ based on a 2*3 matrix corresponding to the first initial parameter and a 3*3 matrix corresponding to the second initial parameter as illustrated below:

$$N_1 = \begin{bmatrix} v_{11} & v_{12} & v_{13} \\ v_{21} & v_{22} & v_{23} \\ v_{31} & v_{32} & v_{33} \\ u_{41} & u_{42} & u_{43} \\ u_{51} & u_{52} & u_{53} \end{bmatrix}, \qquad (5)$$

$$U = \begin{bmatrix} u_{41} & u_{42} & u_{43} \\ u_{51} & u_{52} & u_{53} \end{bmatrix},$$

$$V = \begin{bmatrix} v_{11} & v_{12} & v_{13} \\ v_{21} & v_{22} & v_{23} \\ v_{31} & v_{32} & v_{33} \end{bmatrix}$$

where U refers to the first initial parameter and V refers to the second initial parameter.

Further, the processing engine 112 may determine a 1*3 matrix $P_1$ by multiplying the matrix $M_1$ and the matrix $N_1$:

$$P_1 = M_1 * N_1 = [b\ c\ d\ x\ y] * \begin{bmatrix} v_{11} & v_{12} & v_{13} \\ v_{21} & v_{22} & v_{23} \\ v_{31} & v_{32} & v_{33} \\ u_{41} & u_{42} & u_{43} \\ u_{51} & u_{52} & u_{53} \end{bmatrix} = [v_{11}b + v_{21}c + v_{31}d + u_{41}x + u_{51}y\ v_{12}b + v_{22}c + v_{32}d + u_{42}x + u_{52}y\ v_{13}b + v_{23}c + v_{33}d + u_{43}x + u_{53}y], \qquad (6)$$

Then the processing engine 112 may determine a 1*3 vector corresponding to the output information of the fourth neuron based on the matrix $P_1$ and the predetermined non-linear activation function (e.g., a sigmoid function):

$$S_4 = [g(v_{11}b + v_{21}c + v_{31}d + u_{41}x + u_{51}y),\ g(v_{12}b + v_{22}c + v_{32}d + u_{42}x + u_{52}y),\ g(v_{13}b + v_{23}c + v_{33}d + u_{43}x + u_{53}y)], \qquad (7)$$

where $S_4$ refers to the output information of the fourth neuron, wherein each element in vector $S_4$ is a probability value within a range between 0 and 1.

Merely for illustration, another particular example is described below. Also assuming that the hidden layer includes 4 neurons, the sample route includes 4 sample waypoints, and the predetermined coding length is 3.

Also take the fourth neuron as an example, the processing engine 112 may determine a (3+2)*1 matrix $M_2$ based on a 3*1 vector corresponding to the output information of the third neuron and a 2*1 vector corresponding to the sample location information of the fourth sample waypoint as illustrated below:

$$M_2 = \begin{pmatrix} b \\ c \\ d \\ x \\ y \end{pmatrix}, \qquad (8)$$

$$S_3^T = \begin{pmatrix} b \\ c \\ d \end{pmatrix},$$

$$Z_4^T = \begin{pmatrix} x \\ y \end{pmatrix}$$

where $S_3^T$ refers to the output information of the third neuron (i.e., a transposed matrix of $S_3$ in formula (4)) and $Z_4^T$ refers to the sample location information of the fourth sample waypoint (i.e., a transposed matrix of $Z_4$ in formula (4)).

The processing engine 112 may further determine a 3*(3+2) matrix $N_2$ based on a 2*3 matrix corresponding to the first initial parameter and a 3*3 matrix corresponding to the second initial parameter as illustrated below:

$$N_2 = \begin{bmatrix} v_{11} & v_{21} & v_{31} & u_{41} & u_{51} \\ v_{12} & v_{22} & v_{32} & u_{42} & u_{52} \\ v_{13} & v_{23} & v_{33} & u_{43} & u_{53} \end{bmatrix} \qquad (9)$$

$$U^T = \begin{bmatrix} u_{41} & u_{51} \\ u_{42} & u_{52} \\ u_{43} & u_{53} \end{bmatrix},$$

-continued $$V^T = \begin{bmatrix} v_{11} & v_{21} & v_{31} \\ v_{12} & v_{22} & v_{32} \\ v_{13} & v_{23} & v_{33} \end{bmatrix}$$

where $U^T$ is a transposed matrix of U and $V^T$ is a transposed matrix of V in formula (5).

Further, the processing engine 112 may determine a 3*1 matrix $P_2$ by multiplying the matrix $M_2$ and the matrix $N_2$:

$$P_2 = M_2 * N_2 = \begin{pmatrix} b \\ c \\ d \\ x \\ y \end{pmatrix} * \begin{bmatrix} v_{11} & v_{21} & v_{31} & u_{41} & u_{51} \\ v_{12} & v_{22} & v_{32} & u_{42} & u_{52} \\ v_{13} & v_{23} & v_{33} & u_{43} & u_{53} \end{bmatrix} = \quad (10)$$

$$\begin{bmatrix} v_{11}b + v_{21}c + v_{31}d + u_{41}x + u_{51}y \\ v_{12}b + v_{22}c + v_{32}d + u_{42}x + u_{52}y \\ v_{13}b + v_{23}c + v_{33}d + u_{43}x + u_{53}y \end{bmatrix}$$

Then the processing engine 112 may determine a 1*3 vector corresponding to output information of the fourth neuron based on the 1*3 matrix $P_2$ and the predetermined nonlinear activation function g (e.g., a sigmoid function):

$$S_4 = \begin{pmatrix} g(v_{11}b + v_{21}c + v_{31}d + u_{41}x + u_{51}y) \\ g(v_{12}b + v_{22}c + v_{32}d + u_{42}x + u_{52}y) \\ g(v_{13}b + v_{23}c + v_{33}d + u_{43}x + u_{53}y) \end{pmatrix} \quad (11)$$

where $S_4$ refers to the output information of the fourth neuron, wherein each element in vector $S_4$ is a probability value within a range between 0 and 1.

For illustration purposes, the present disclosure takes a coding length "3" as an example, it should be noted that the coding length may be adjustable under different situations. It is known that the larger the coding length is, the more time that the training process may need, and accordingly the higher the accuracy of the RNN model may be.

In step 640, the processing engine 112 (e.g., the modification unit 540) (e.g., the processing circuits of the processor 220) may determine trained parameters of the RNN model based on the output information. For example, the processing engine 112 may modify the first initial parameter and the second initial parameter by using a backpropagation algorithm or a gradient descent algorithm. The gradient descent algorithm may include Stochastic Gradient Descent, Batch Gradient Descent, Mini-batch Gradient Descent, etc.

In some embodiments, the processing engine 112 may modify the first initial parameter and the second initial parameter according to a Maximum Likelihood Estimate algorithm according to formula (12) below:

$$[U,V] = \mathrm{argmax}(S_1'*S_2'* \ldots *S_L') \; (1 \leq j \leq L) \quad (12)$$

where $S_j'$ refers to output information of a last neuron associated with a sample route j, L refers to a number of the plurality of sample routes. It can be seen that the objective of the maximum likelihood estimate is to maximize a probability of each sample route.

In some embodiments, for convenience, the processing engine 112 may modify the first initial parameter and the second initial parameter according to formula (13) below:

$$[U,V] = \mathrm{argmax}(\log(S_1') + \log(S_2') + \ldots + \log(S_j') + \ldots + \log(S_L')), \; (1 \leq j \leq L) \quad (13)$$

It should be noted that the process 600 for training a RNN model is an iterative process. The iterative process may include one or more iterations. The processing engine 112 may modify the first initial parameter and the second initial parameter of the RNN model based on the output information of the neurons in the hidden layer of the RNN in each iteration until a predetermined condition is satisfied, for example, a number of the iterations is larger than a threshold.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600. In the storing step, the processing engine 112 may store any information and/or data (e.g., the initial parameters, the plurality of sample routes, etc.) associated with the RNN model.

Figure 7:
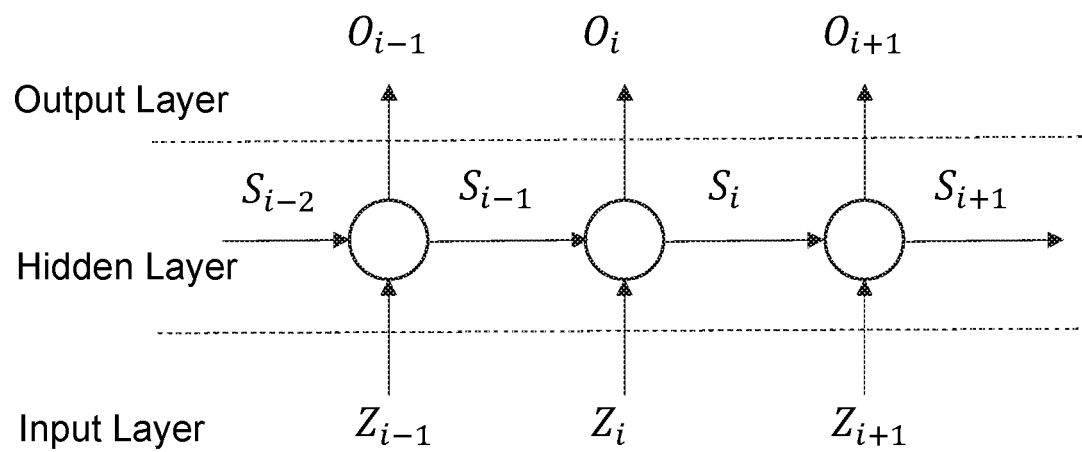
FIG. 7 is a schematic diagram illustrating an exemplary structure of a RNN model according to some embodiments of the present disclosure.

FIG. 7 is a schematic diagram illustrating an exemplary structure of a RNN model according to some embodiments of the present disclosure. As illustrated, the RNN model includes an input layer, a hidden layer, and an output layer. The hidden layer includes a plurality of neurons. It can be seen that for an $i^{th}$ neuron in the hidden layer, an input includes location information of an $i^{th}$ waypoint and output information of a $(i-1)^{th}$ neuron.

Figure 8:
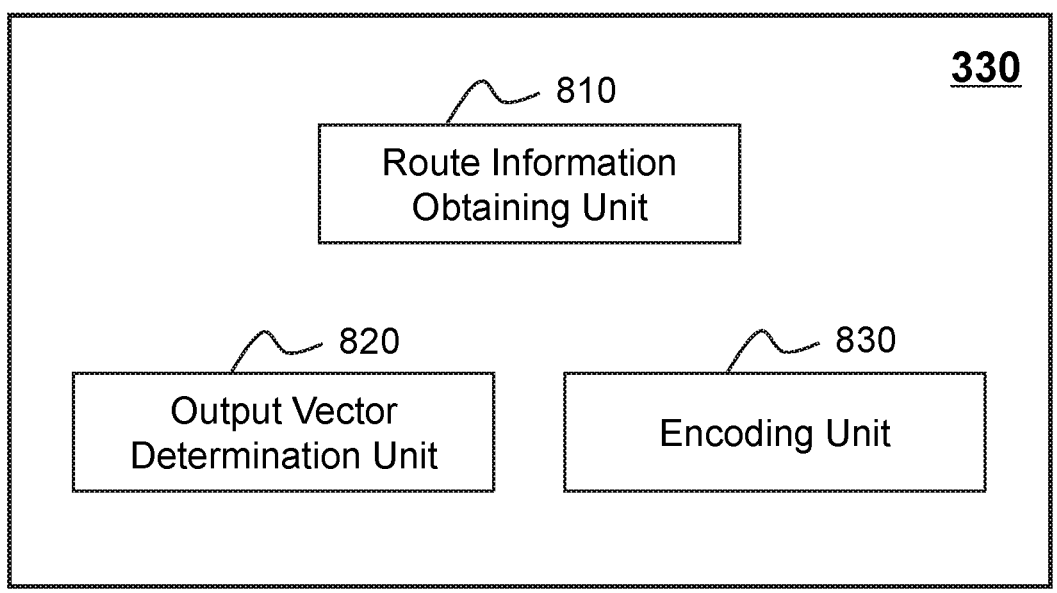
FIG. 8 is a block diagram illustrating an exemplary encoding module according to some embodiments of the present disclosure.

FIG. 8 is a block diagram illustrating an exemplary encoding module 330 according to some embodiments of the present disclosure. The encoding module 330 may include a route information obtaining unit 810, an output vector determination unit 820, an encoding unit 830.

The route information obtaining unit 810 may be configured to obtain route information of a target route. As described in connection with step 410 and/or step 620, the route information of the target route may include location information (e.g., longitude coordinate information, latitude coordinate information) of a plurality of waypoints included in the target route. A sequence of the plurality of waypoints may correspond to a direction of the target route.

The output vector determination unit 820 may be configured to determine an n-dimensional vector based on a trained RNN model and the route information of the target route. The output vector determination unit 820 may obtain the trained RNN model from a storage device (e.g., the storage 150) disclosed elsewhere in the present disclosure. As described in connection with FIG. 6 and the description thereof, the output vector determination unit 820 may input the route information of the target route into the trained RNN model and determine output information (i.e., an n-dimensional vector) of a last neuron in the hidden layer of the RNN model according to formula (3).

The encoding unit 830 may be configured to generate a target code corresponding to the target route by encoding the n-dimensional vector based on an encoding function. The encoding unit 830 may generate the target code based on a Hash function. The format of the Hash function may be adjustable under different situations, accordingly, the format of the target code may be binary, decimal, hexadecimal, etc.

Figure 9:
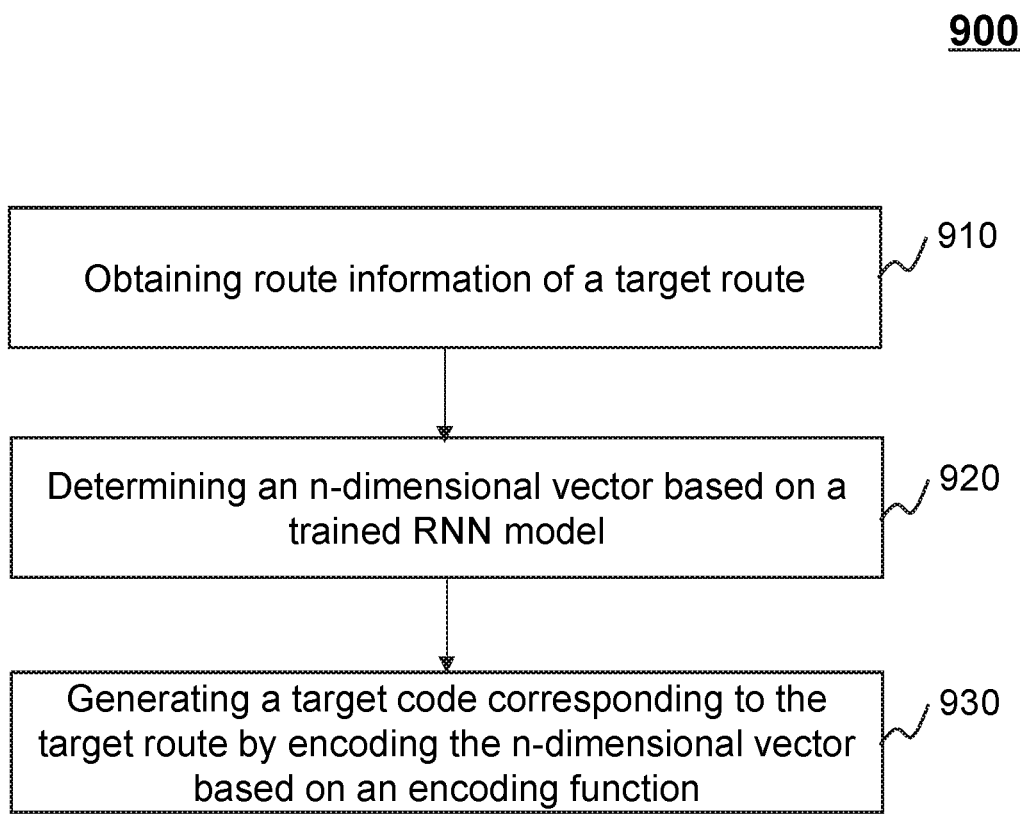
FIG. 9 is a flowchart illustrating an exemplary process for encoding route information of a route according to some embodiments of the present disclosure.

FIG. 9 is a flowchart illustrating an exemplary process for encoding route information of a route according to some embodiments of the present disclosure. The process 900 may be implemented as a set of instructions (e.g., an application) stored in the storage ROM 230 or RAM 240. The processor 220 and/or the units in FIG. 8 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In step 910, the processing engine 112 (e.g., the route information obtaining unit 810) (e.g., the interface circuits of the processor 220) may obtain route information of a target route. As described in connection with step 410 and/or step 620, the route information of the target route may include location information (e.g., longitude coordinate information, latitude coordinate information) of a plurality of waypoints included in the target route. A sequence of the plurality of waypoints may correspond to a direction of the target route.

In step 920, the processing engine 112 (e.g., the output vector determination unit 820) (e.g., the processing circuits of the processor 220) may determine an n-dimensional vector based on a trained RNN model. The processing engine 112 may obtain the trained RNN model from a storage device (e.g., the storage 150) disclosed elsewhere in the present disclosure. As described in connection with FIG. 6 and the description thereof, the processing engine 112 may input the route information of the target route into the trained RNN model and determine output information (i.e., an n-dimensional vector) of a last neuron in the hidden layer of the RNN model according to formula (3).

In step 930, the processing engine 112 (e.g., the encoding unit 830) (e.g., the processing circuits of the processor 220) may generate a target code corresponding to the target route by encoding the n-dimensional vector based on an encoding function. For example, the processing engine 112 may generate the target code according to formula (14) below:

$$C = [h(s_1), h(s_2), h(s_h), \ldots, h(s_n)], (1 \le h \le n), \quad (14)$$

$$h(x) = \begin{cases} 1, & x > 0.5 \\ 0, & x \ll 0.5 \end{cases},$$

where C refers to the target code corresponding to the target route, h(x) refers to a Hash function, $s_h$ refers to an $h^{th}$ element in the n-dimensional vector, and $h(s_h)$ refers to an code value corresponding to the $h^{th}$ element in the target code.

It should be noted that the Hash function above is provided for illustration purposes, and the format of the Hash function may be adjustable under different situations, accordingly, the format of the target code may be binary, decimal, hexadecimal, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
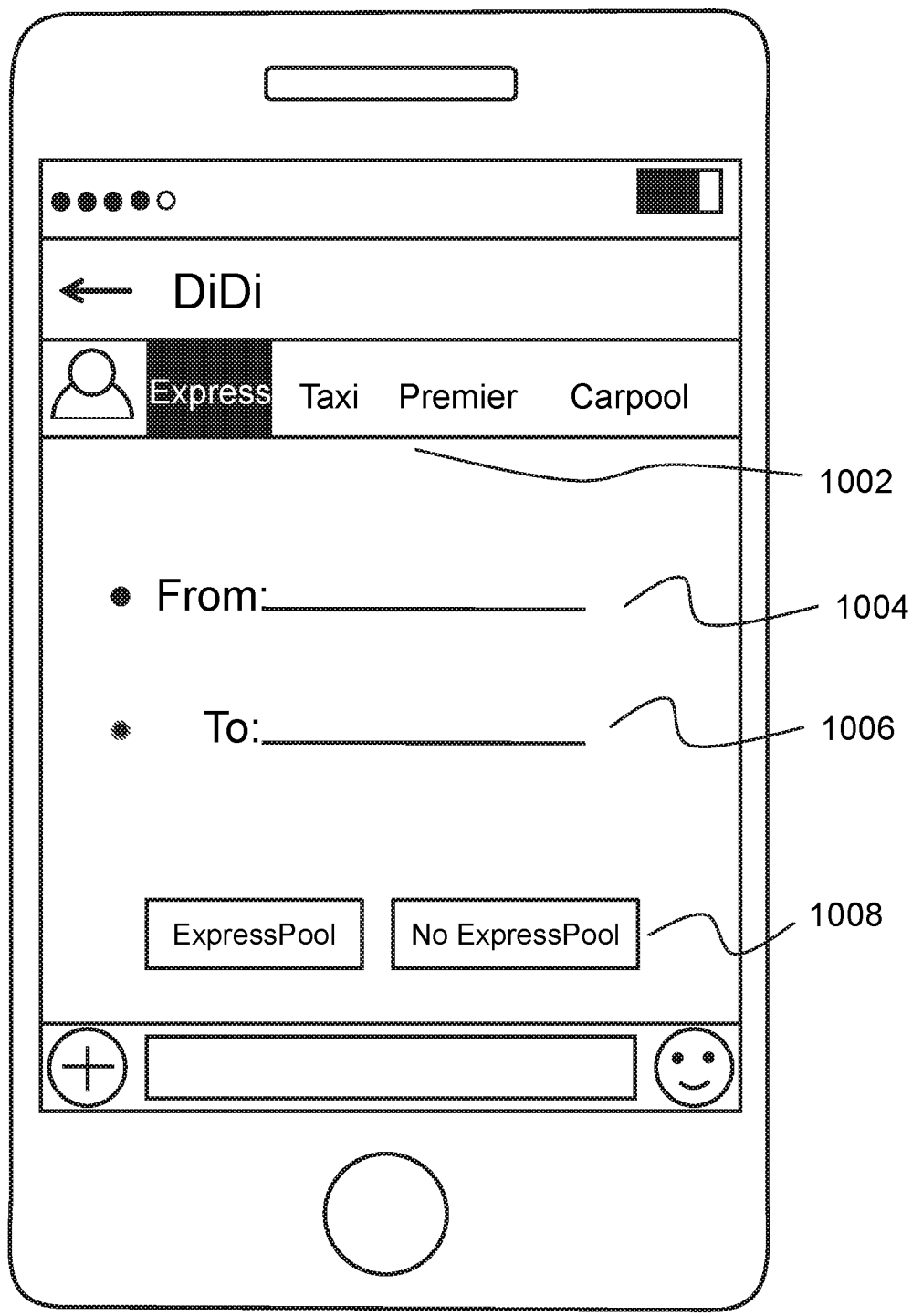
FIG. 10 is a schematic diagram illustrating an exemplary user interface presenting a service request according to some embodiments of the present disclosure.

FIG. 10 is a schematic diagram illustrating an exemplary user interface presenting a service request according to some embodiments of the present disclosure. The user interface 1000 may be presented by a terminal (e.g., the requestor terminal 130, the provider terminal 140). The user interface 1000 may include one or more user interface elements (also referred to as the "UI elements") for presenting information associated with the service request. Each of the UI elements may be and/or include, for example, one or more buttons, icons, checkboxes, message boxes, text fields, data fields, search fields, etc.

For example, as illustrated, the user interface 1000 may include a UI element 1002 for presenting a service type (e.g. Express, Taxi, Premier, Carpool). The user interface 1000 may also include a UI element 1004 for presenting an input box used for receiving an input associated with a start location and a UI element 1006 for presenting an input box used for receiving an input associated with a destination. Further, the user interface 1000 may also include a UI element 1008 for presenting an option (e.g., "ExpressPool," "No ExpressPool") for agreeing to share the transportation service with other requestors or not.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method implemented on a computing device having at least one processor, at least one storage medium, and a communication platform connected to a network, the method comprising:
   receiving a service request from a terminal of a service requester or a service provider, wherein the service request includes information relating to a start location and a destination of a first route;
   in response to the service request, obtaining route information of the first route;
   encoding the route information of the first route into a first code based on a target model, wherein:
      the target model is configured to encode a route into a code having a predetermined length of n bytes, n being an integer larger than 1 and encode substantially similar routes into a same code;
      the target model is a recurrent neural network (RNN) model having a hidden layer with at least m neurons; and
      to obtain the RNN model, the method further includes:
         setting initial parameters of the RNN model, wherein the initial parameters include a first parameter associated with an input layer of the RNN model and a second parameter associated with the hidden layer of the RNN model;
         obtaining sample route information of a plurality of sample routes, wherein each of the plurality of sample routes includes a plurality of sample waypoints, and the sample route information includes sample location information of the plurality of sample waypoints;
         for each of the plurality of sample routes, determining output information associated with the at least m neurons in the hidden layer based on the initial parameters, a predetermined nonlinear activation function, and the sample route information, wherein for a first neuron in the at least m neurons, an input is sample location information of a first sample waypoint in the plurality of sample waypoints and for an $i^{th}$ neuron in the at least m neurons, the input includes sample location information of an $i^{th}$ waypoint in the plurality of waypoints and an output of an $(i-1)^{th}$ neuron in the at least m neurons; and
         determining trained parameters of the RNN model based on the output information;
   accessing a target database in the at least one storage medium, wherein the target database includes a plurality of candidate codes encoded through the target model from a plurality of candidate routes;
   identifying from the plurality of candidate codes, a second code based on the first code, the second code being associated with at least one second route; and
   generating on an interface of the terminal a presentation of information associated with the at least one second route.

2. The method of claim 1, wherein the route information of the first route includes location information of m waypoints along the first route, a sequence of the m waypoints corresponding to a direction of the first route, wherein m is an integer larger than 1 and independent from n.

3. The method of claim 1, wherein the determining output information associated with the at least m neurons in the hidden layer includes:
   determining a first 1*n vector corresponding to the output of the $(i-1)^{th}$ neuron;
   determining a 1*2 vector corresponding to the sample location information of the $i^{th}$ sample waypoint;
   determining a 1*(n*2) matrix based on the 1*n vector corresponding to the $(i-1)^{th}$ neuron and the 1*2 vector corresponding to the sample location information of the $i^{th}$ sample waypoint;

determining a (n+2)*n matrix based on the first parameter and the second parameters, wherein the first parameter is an n*n matrix and the second parameter is a 2*n matrix;

determining a 1*n matrix corresponding to the $i^{th}$ neuron based on the 1*(n+2) matrix and the (n+2)*n matrix; and determining a second 1*n vector corresponding to an output of the $i^{th}$ neuron based on the 1*n matrix and the predetermined nonlinear activation function.

4. The method of claim 1, wherein the determining output information associated with the at least m neurons includes:

determining a first n*1 vector corresponding to the output of the (i−1)th neuron;

determining a 2*1 vector corresponding to the sample location information of the sample waypoint;

determining a (n+2)*1 matrix based on the n*1 vector corresponding to the $(i-1)^{th}$ neuron and the 2*1 vector corresponding to the sample location information of the $i^{th}$ sample waypoint;

determining an n*(n+2) matrix based on the first parameter and the second parameters, wherein the first parameter is an n*n matrix and the second parameter is an n*2 matrix;

determining a n*1 matrix corresponding to the neuron based on the 1*(n+2) matrix and the (n+2)*n matrix; and determining a second nil vector corresponding to an output of the $i^{th}$ neuron based on the n*1 matrix and the predetermined nonlinear activation function.

5. The method of claim 1, wherein the determining trained parameters of the target model based on the output information includes:

determining the trained parameters based on a backpropagation algorithm or a gradient descent algorithm.

6. The method of claim 1, wherein the predetermined nonlinear activation function includes at least one of a sigmoid function, a hyperbolic tangent (tanh) function, or a Rectified Linear Units (ReLu) function.

7. The method of claim 1, wherein the encoding of the route information of the first route into the first code based on the target model includes:

determine an n-dimensional vector based on the target model; and generate the first code by encoding the n-dimensional vector based on an encoding function.

8. The method of claim 7, wherein the encoding function is a function below:

$$h(x) = \begin{cases} 1, & x > 0.5 \\ 0, & x \ll 0.5 \end{cases}$$

where x refers to a value of an element in the n-dimensional vector, and h(x) refers to a code value corresponding to the element in the first code.

9. The method of claim 1, wherein the target model includes a long short-term memory network (LSTM) model.

10. A non-transitory computer readable medium comprising a set of instructions for searching for a route that, when executed by at least one processor, cause the at least one processor to effectuate a method comprising:

receiving a service request from a terminal of a service requester or a service provider, wherein the service request includes information relating to a start location and a destination of a first route;

in response to the service request, obtaining route information of the first route;

encoding the route information of the first route into a first code based on a target model, wherein:

the target model is configured to encode a route into a code having a predetermined length of n bytes, n being an integer larger than 1, and encode substantially similar routes into a same code;

the target model is a recurrent neural network (RNN) model having a hidden layer with at least m neurons; and to obtain the RNN model, the method further includes:

setting initial parameters of the RNN model, wherein the initial parameters include a first parameter associated with an input layer of the RNN model and a second parameter associated with the hidden layer of the RNN model;

obtaining sample route information of a plurality of sample routes, wherein each of the plurality of sample routes includes a plurality of sample waypoints, and the sample route information includes sample location information of the plurality of sample waypoints;

for each of the plurality of sample routes, determining output information associated with the at least m neurons in the hidden layer based on the initial parameters, a predetermined nonlinear activation function, and the sample route information, wherein for a first neuron in the at least m neurons, an input is sample location information of a first sample waypoint in the plurality of sample waypoints and for an $i^{th}$ neuron in the at least m neurons, the input includes sample location information of an $i^{th}$ waypoint in the plurality of waypoints and an output of an $(i-1)^{th}$ neuron in the at least m neurons; and determining trained parameters of the RNN model based on the output information;

accessing a target database in the at least one storage medium, wherein the target database includes a plurality of candidate codes encoded through the target model from a plurality of candidate routes;

identifying from the plurality of candidate codes, a second code based on the first code, the second code being associated with at least one second route; and generating on an interface of the terminal a presentation of information associated with the at least one second route.

11. The non-transitory computer readable medium of claim 10, wherein the determining output information associated with the at least m neurons in the hidden layer includes:

determining a first 1*n vector corresponding to the output of the (i−1)th neuron;

determining a 1*2 vector corresponding to the sample location information of the $i^{th}$ sample waypoint;

determining a 1*(n+2) matrix based on the 1*n vector corresponding to the $(i-1)^{th}$ neuron and the 1*2 vector corresponding to the sample location information of the $i^{th}$ sample waypoint;

determining a (n+2)*n matrix based on the first parameter and the second parameters, wherein the first parameter is an n*n matrix and the second parameter is a 2*n matrix;

determining a 1*n matrix corresponding to the neuron based on the 1*(n+2) matrix and the (n+2)*n matrix; and determining a second 1*n vector corresponding to an output of the $i^{th}$ neuron based on the 1*n matrix and the predetermined nonlinear activation function.

12. A system for displaying information of a similar route on art interface of a terminal, comprising:
at least one storage medium including a set of instructions for searching for a route;
at least one processor in communication with the at least one storage medium, wherein when executing the set of instructions, the at least one processor is directed to:
receive a service request from a terminal of a service requestor or a service provider, wherein the service request includes information relating to a start location and a destination of a first route;
in response to the service request, obtain route information of the first route;
encode the route information of the first route into a first code based on a target model, wherein:
the target model is configured to encode a route into a code having a predetermined length of n bytes, n being an integer larger than 1, and encode substantially similar routes into a same code;
the target model is a recurrent neural network (RNN) model having a hidden layer with at least m neurons; and
to obtain the RNN model, the at least one processor is further directed to:
set initial parameters of the RNN model, wherein the initial parameters include a first parameter associated with an input layer of the RNN model and a second parameter associated with the hidden layer of the RNN model;
obtain sample route information of a plurality of sample routes, wherein each of the plurality of sample routes includes a plurality of sample waypoints, and the sample route information includes sample location information of the plurality of sample waypoints;
for each of the plurality of sample routes, determine output information associated with the at least m neurons in the hidden layer based on the initial parameters, a predetermined nonlinear activation function, and the sample route information, wherein for a first neuron in the at least m neurons, an input is sample location information of a first sample waypoint in the plurality of sample waypoints and for an $i^{th}$ neuron in the at least m neurons, the input includes sample location information of an $i^{th}$ waypoint in the plurality of waypoints and an output of an $(i-1)^{th}$ neuron in the at least m neurons; and
determine trained parameters of the RNN model based on the output information;
access a target database in the at least one storage medium, wherein the target database includes a plurality of candidate codes encoded through the target model from a plurality of candidate routes;
identify, from the plurality of candidate codes, a second code based on the first code, the second code being associated with at least one second route; and
generate on an interface of the terminal a presentation of information associated with the at least one second route.

13. The system of claim 12, wherein the route information of the first route includes location information of m waypoints along the first route, a sequence of the m waypoints corresponding to a direction of the first route, wherein m is an integer larger than 1 and independent from n.

14. The system of claim 12, wherein to determine output information associated with the at least m neurons in the hidden layer, the at least one processor is further directed to:
determine a first 1*n vector corresponding to the output of the $(i-1)^{th}$ neuron;
determine a 1*2 vector corresponding to the sample location information of the $i^{th}$ sample waypoint;
determine a 1*(n+2) matrix based on the 1*n vector corresponding to the $(i-1)^{th}$ neuron and the 1*2 vector corresponding to the sample location information of the $i^{th}$ sample waypoint;
determine a (n+2)*n matrix based on the first parameter and the second parameters, wherein the first parameter is an n*n matrix and the second parameter is a 2*n matrix;
determine a 1*n matrix corresponding to the neuron based on the 1*(n*2) matrix and the (n+2)*n matrix; and
determine a second 1*n vector corresponding to an output of the $i^{th}$ neuron based on the 1*n matrix and the predetermined nonlinear activation function.

15. The system of claim 12, wherein to determine output information associated with the at least in neurons in the hidden layer, the at least one processor is further directed to:
determine a first n*1 vector corresponding to the output of the $(i-1)^{th}$ neuron;
determine a 2*1 vector corresponding to the sample location information of the $i^{th}$ sample waypoint;
determine a (n+2)*1 matrix based on the n*1 vector corresponding to the $(i-1)^{th}$ neuron and the 2*1 vector corresponding to the sample location information of the sample waypoint;
determine an n*(n+2) matrix based on the first parameter and the second parameters, wherein the first parameter is an n*n matrix and the second parameter is an n*2 matrix;
determine a n*1 matrix corresponding to the neuron based on the 1*(n+2) matrix and the (n+2)*n matrix; and
determine a second n*1 vector corresponding to an output of the $i^{th}$ neuron based on the n*1 matrix and the predetermined nonlinear activation function.

16. The system of claim 12, wherein to determine trained parameters of the target model based on the output information, the at least one processor is further directed to:
determine the trained parameters based on a backpropagation algorithm or a gradient descent algorithm.

17. The system of claim 12, wherein the predetermined nonlinear activation function includes at least one of a sigmoid function, a hyperbolic tangent (tanh) function, or a Rectified Linear Units (ReLu) function.

18. The system of claim 12, wherein to encode the route information of the first route into the first code based on the target model, the at least one processor is further directed to:
determine an n-dimensional vector based on the target model; and
generate the first code by encoding the n-dimensional vector based on an encoding function.

19. The system of claim 18, wherein the encoding function is a function below:

$$h(x) = \begin{cases} 1, & x > 0.5 \\ 0, & x \ll 0.5 \end{cases}$$

where refers to a value of an element in the n-dimensional vector, and h(x) refers to a code value corresponding to the element in the first code.

20. The system of claim 12, wherein the target model includes a long short-term memory network (LSTM) model.

* * * * *